(12) United States Patent
Minakuchi

(10) Patent No.: US 6,344,644 B1
(45) Date of Patent: Feb. 5, 2002

(54) OPTICAL SCANNING DEVICE

(75) Inventor: Tadashi Minakuchi, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/419,876

(22) Filed: Oct. 15, 1999

(30) Foreign Application Priority Data

Oct. 16, 1998 (JP) ............................................. 10-294758
Oct. 16, 1998 (JP) ............................................. 10-294759

(51) Int. Cl.$^7$ .......................... G02B 26/10; H04N 1/04; B41J 2/44
(52) U.S. Cl. ........................ 250/234; 235/236; 347/250
(58) Field of Search .................. 250/234, 235, 250/236, 214 R; 347/235, 250, 233, 225; 358/409, 410, 412, 413, 475

(56) References Cited

U.S. PATENT DOCUMENTS

| | | | |
|---|---|---|---|
| 5,793,036 A | 8/1998 | Minakuchi | |
| 5,883,657 A | * 3/1999 | Minakuchi | ................... 347/235 |
| 5,933,266 A | 8/1999 | Minakuchi | |
| 6,043,484 A | * 3/2000 | Park | ............................ 250/234 |

* cited by examiner

*Primary Examiner*—John R. Lee
(74) *Attorney, Agent, or Firm*—Greenblum & Bernstein P.L.C.

(57) ABSTRACT

An optical scanning device is provided with a light source, a scanning system, a light receiving unit having a plurality of light receiving elements arranged in a main scanning direction, a resonance amplifying system that amplifies the light receiving signals of the light receiving elements. A clock signal is generated based on the resonance amplified signals. Further, a delay signal is generated to wait for stabilization of the clock signal. A synchronizing signal is generated based on the clock signal and the delay signal.

22 Claims, 16 Drawing Sheets

LIGHT RECEIVING SIGNALS

OUTPUT OF 1ST ADDER

OUTPUT OF 2ND ADDER

SUM OF LIGHT RECEIVING SIGNALS

OUTPUT OF 2ND COMPARATOR

DLY SIGNAL

OUTPUT OF 1ST ADDER

OUTPUT OF 2ND ADDER

OUTPUT OF NARROW-BAND AMPLIFIERS

SOS 1

DLY

WIN 2

SOS

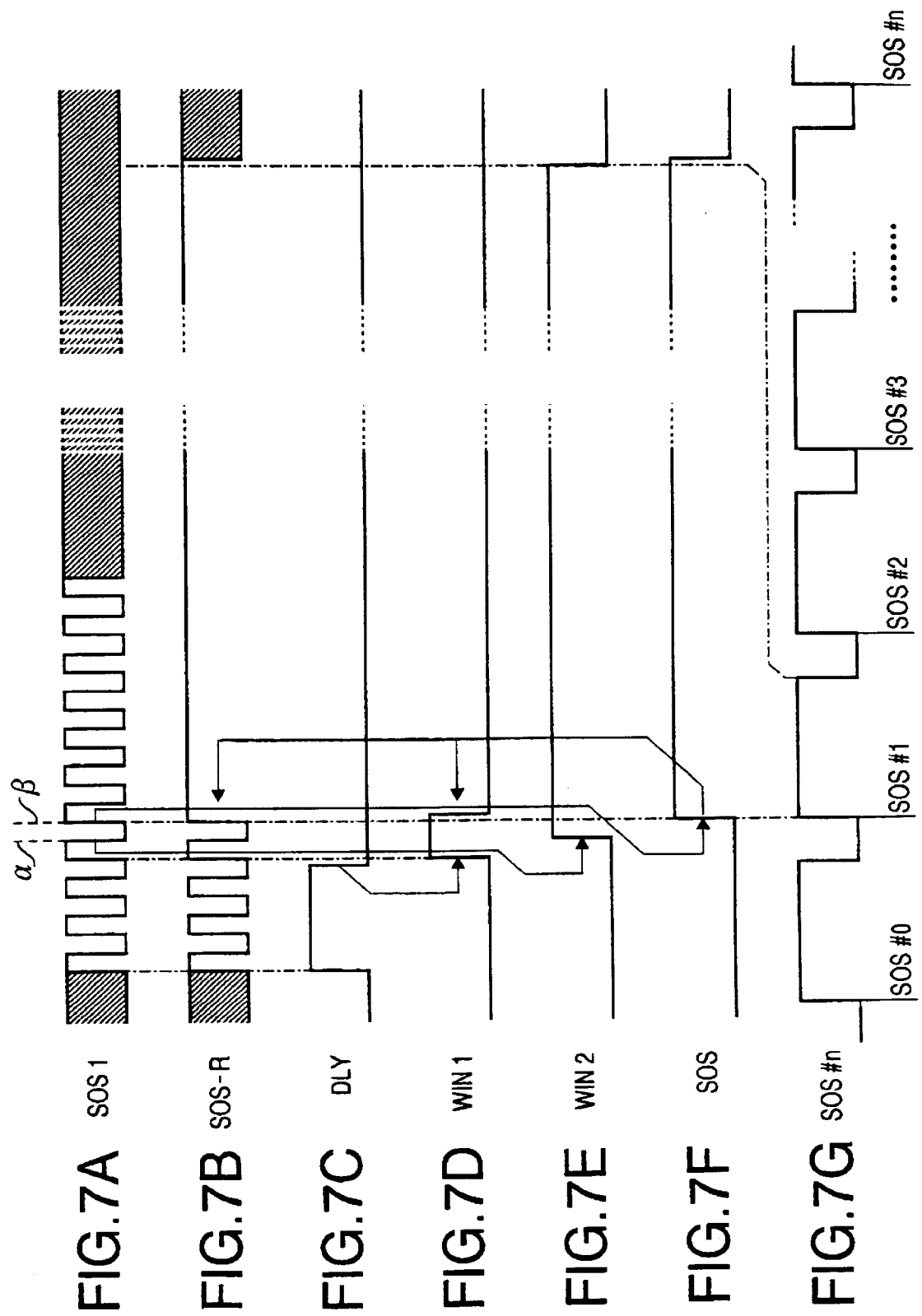

FIG. 9A LIGHT RECEIVING SIGNALS
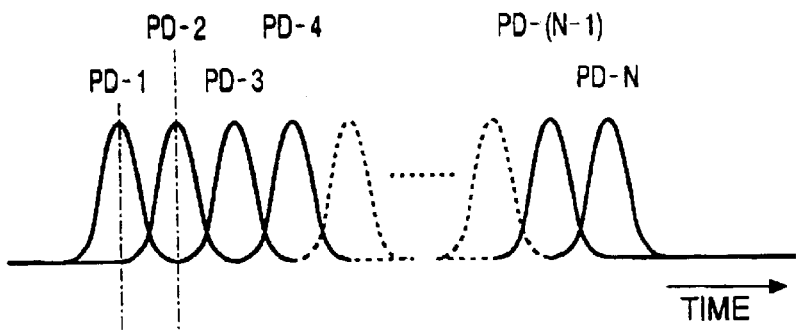
FIG. 9B OUTPUTS OF PD1 AND PD2
FIG. 9C OUTPUT OF 2ND COMPARATOR
FIG. 9D SUM OF OUTPUTS OF PD1 AND PD2
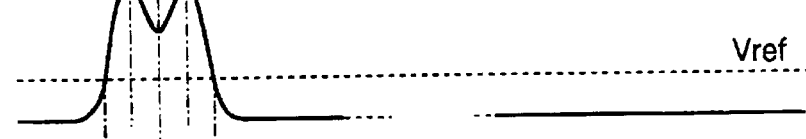
FIG. 9E OUTPUT OF 3RD COMPARATOR
FIG. 9F OUTPUT OF AND GATE
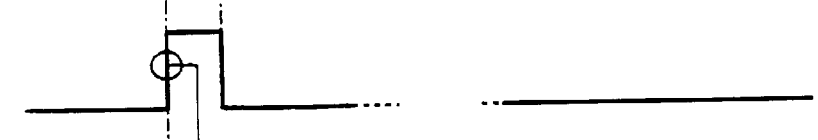
FIG. 9G DLY SIGNAL
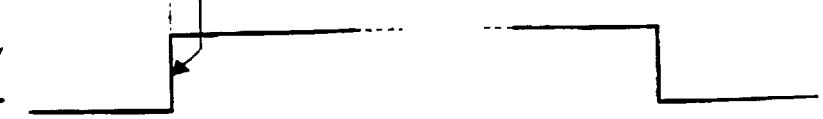

OUTPUT OF
1ST ADDER

OUTPUT OF
2ND ADDER

OUTPUT OF
NARROW-BAND
AMPLIFIERS

SOS 1

DLY

WIN 2

SOS

WHEN THE WIDTH IS THE SAME

LIGHT RECEIVING SIGNALS

SUM OF LIGHT RECEIVING SIGNALS

OUTPUT OF COMPARATOR 131

OUTPUT OF AND GATE 132

DLY SIGNAL

OUTPUT OF ADDER 121

OUTPUT OF NARROW-BAND AMP 123

SOS 1

DLY

WIN 2

SOS

FIG.16A
OUTPUT OF ADDER 121
FIG.16B
OUTPUT OF NARROW-BAND AMPLIFIERS
SATURATION LEVEL
1ST AMPLIFIER
2ND AMPLIFIER
SATURATION LEVEL
FIG.16C
SOS 1
FIG.16D
DLY
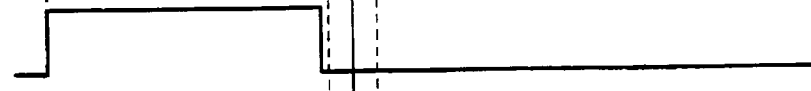
FIG.16E
WIN 2
FIG.16F
SOS
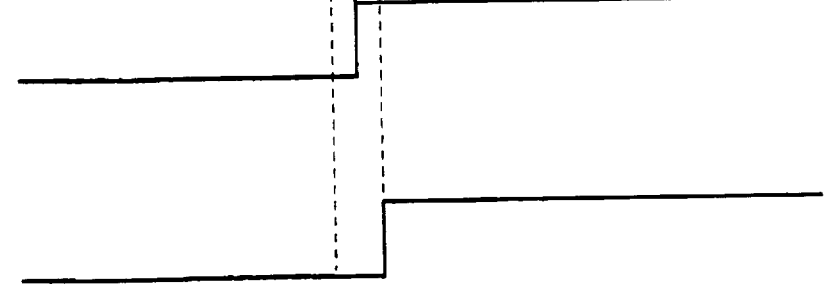

OPTICAL SCANNING DEVICE

BACKGROUND OF THE INVENTION

The present invention relates to an optical scanning device for a laser beam printer or the like. In particular, the present invention relates to an optical scanning device utilizing an SOS (Start Of Scan) signal as a synchronizing signal for adjusting a timing of a scanning beam.

Conventionally, in an optical scanning device such as an LSU (Laser Scanning Unit), the SOS signal is obtained as follows.

In the conventional LSU, the scanning laser beam is received by a photo diode, which outputs a light detection signal. Based on the light detection signal, the SOS signal is generated. Specifically, in the LSU, a laser beam LB is emitted by a laser diode. The laser beam is deflected by a polygon mirror which rotates at a relatively high speed to deflect the laser beam to scan within a predetermined angular range. The scanning beam is directed onto a photoconductive drum via an fθ lens and scans the circumferential surface of the photoconductive drum in a direction of an axis thereof from one side to another (i.e., in a main scanning direction). While the beam scans in the main scanning direction, the photoconductive drum rotates about the axis thereof (i.e., an auxiliary scanning is performed). Within a scanning range of the laser beam, but out of an image forming area of the photoconductive drum, a photo diode is arranged. The photo diode receives the scanning beam and outputs a light detection signal, which is transmitted to the SOS signal processing circuit. Based on the SOS signal output by the SOS signal processing circuit, a controller controls an LD drive circuit. If the image formation is executed a predetermined period after the SOS signal has been output (i.e., the image formation is executed synchronously with the SOS signal), the image is always formed in the imaging area on the photoconductive drum.

In the photo diode for obtaining the SOS signal, received amount of light may vary due to variation of output power of the laser beam, oscillation of surfaces of the polygon mirror or the like. Therefore, the level of the light detection signal output by the photo diode may not-be constant. Further, the level of the light detection signal may also vary due to noise introduced at the photo diode and/or the signal processing circuit, a deviation of DC component of the light detection signal due to the dark current, and while the signal is transmitted from the photo diode to the signal processing circuit.

If the SOS signal is generated based on such an unstable light detection signal including noises, the timing of the SOS signal may vary, and it is difficult to obtain a reliable SOS signal.

In particular, if the conventional SOS signal generating circuit generates the SOS signal by comparing the light receiving signal value with a predetermined threshold value, the variation of the signal level directly affects the timing of the SOS signal.

SUMMARY OF THE INVENTION

It is therefore an object of the invention to provide an SOS signal generating circuit which is capable of suppressing noises in the light receiving signal and generating a reliable SOS signal.

According to an aspect of the invention, there is provided an optical scanning device, provided with:

a light source;

a scanning system which deflect the beam emitted by the light source to scan;

a light receiving unit having a plurality of light receiving elements arranged in a direction in which the scanning beams scans, a light receiving signal being output by each of the light receiving element upon incident of the scanning beam, the plurality of light receiving elements being divided into two groups such that every other light receiving element is fallen in the same group and adjoining light receiving elements are fallen in different groups;

a resonance amplifying system that amplifies the light receiving signals of the light receiving elements of the two groups, respectively;

a clock signal generating unit that generates a clock signal in accordance with the resonance amplified signals;

a delay signal generating circuit that generates a delay signal for generating a synchronizing signal in accordance with the light receiving signals output by at least part of the plurality of light receiving elements; and a logic circuit which generates the synchronizing signal based on the clock signal output by the clock signal generating unit and the delay signal output by the delay signal generating unit.

The light receiving signals corresponding to each group are synthesized and resonance-amplified, and the clock signal is generated therefrom. Further, the delay signal which defines the start of the synchronizing signal is generated based on the light receiving signals. Then, the synchronizing signal is generated using the stabilized portion of the clock signal. Accordingly, a reliable SOS signal can be obtained.

Optionally, the scanning optical system may include:

a first adder that synthesizes the light receiving signals output by the light receiving elements fallen in one of the pair of groups; and a second adder that synthesizes the light receiving signals output by the light receiving elements fallen in the other one of the pair of groups.

In this case, the resonance amplifying system may include:

a pair of narrow-band amplifiers that resonance amplify signals respectively output by the first and second adders; and a first comparator for comparing the resonance amplified signals output by the pair of narrow-band amplifiers, output signal of the first comparator being utilized as the clock signal.

Further optionally, the resonance frequencies of the pair of narrow-band amplifiers are substantially coincide with the frequency of the sum of the light receiving signals output from the first and second adders, respectively.

Still optionally, the delay signal generating unit may include:

a second comparator that compares the sum of the light receiving signals output from all of the plurality of light receiving elements with a predetermined reference level; and a first timer circuit that is triggered in response to an output signal of the second comparator to output a delay signal for a predetermined period.

Further, the delay signal generating unit may include:

a third comparator that compares the light receiving signals output by first two of the plurality of light receiving elements;

a fourth comparator that compares the sum of the output signals of the first two of the plurality of light receiving elements with a predetermined reference level;

an AND gate that applies AND operation to the outputs of the third and fourth comparators;

a third timer circuit that is triggered in response to an output signal of the AND gate to output a delay signal for a predetermined period.

Further optionally, the logic circuit unit may be provided with;

an enabling signal output system that outputs an enabling signal upon end of the delay signal output by the delay signal generating unit;

a second timer that outputs, in accordance with the enabling signal and the clock signal output by the clock signal generating unit, a gate signal which is kept for a predetermined period; and a logic gate that outputs the synchronizing signal when the clock signal and the gate signal are input.

Optionally, the delay signal output by the delay signal generating unit is kept output at least when the light receiving signals are output by the plurality of light receiving elements.

In particular, the delay signal is terminated by a point of time at which an amplitude of the output signal of each narrow-band amplifier is a half of the maximum value thereof.

Further, the delay signal output by the delay signal generating unit is terminated within a rage from one period before to one period after with respect to a point of time where the output of the resonance amplifier has a maximum value.

According to another aspect of the invention, there is provided an optical scanning device, provided with:

a light source;

a scanning system which deflect the beam emitted by the light source to scan;

a light receiving unit having a plurality of light receiving elements arranged in a direction in which the scanning beams scans, a light receiving signal being output by each of the light receiving element upon incident of the scanning beam;

a resonance amplifying system that amplifies the light receiving signals of the light receiving elements;

a clock signal generating unit that generates a clock signal in accordance with the resonance amplified signals;

a delay signal generating unit that generates a delay signal for generating a synchronizing signal in accordance with the light receiving signals output by the plurality of light receiving elements; and a logic circuit which generates the synchronizing signal based on the clock signal output by the clock signal generating unit and the delay signal output by the delay signal generating unit.

The light receiving signals are synthesized, and then resonance-amplified. Then, based on the resonance-amplified signal(s), a clock signal is generated. Utilizing the delay signal, detection of the clock signal is delayed until the clock signal is considered to be stabilized. Then, in accordance with the clock signal, the SOS signal is generated. Thus, a reliable SOS signal can be obtained.

Optionally, one of the plurality of light receiving elements which is firstly scanned by the scanning beam may be constructed to have wider than the other light receiving elements.

Further optionally, among all the light receiving elements, one of every predetermined number of light receiving elements is used for outputting the light receiving signal.

Furthermore, the scanning optical system may be provided with an adder that synthesizes the light receiving signals output by the light receiving elements, and the resonance amplifying system may include: a narrow-band amplifier that resonance amplify signals output by the adder; and a first comparator for comparing the resonance amplified signals output by the of narrow-band amplifier with a predetermined reference level, output signal of the first comparator being utilized as the clock signal.

Preferably, the resonance frequency of the narrow-band amplifier substantially coincides with the frequency of the synthesized signal of the light receiving signals output from the adder.

In particular case, the delay signal generating unit may be provided with: a second comparator that compares the sum of the light receiving signals output from the plurality of light receiving elements with a predetermined reference level; and a first timer circuit that is triggered in response to an output signal of the second comparator to output a delay signal for a predetermined period.

In this case, delay signal output by the delay signal generating unit may be kept output at least when the light receiving signals are output by the plurality of light receiving elements. Further, the delay signal may be terminated by a point of time at which an amplitude of the output signal of the narrow-band amplifier is. a half of the maximum value thereof. Alternatively, the delay signal output by the delay signal generating unit may be terminated within a rage from one period before to one period after with respect to a point of time where the output of the resonance amplifier has a maximum value.

Further optionally, the logic circuit unit may include: an enabling signal output system that outputs an enabling signal upon end of the delay signal output by the delay signal generating unit; a second timer that outputs, in accordance with the first gate signal and the clock signal output by the clock signal generating unit, a gate signal which is kept for a predetermined period; and a logic gate that outputs the synchronizing signal when the delay signal and the gate signal are input.

According to another aspect of the invention, there is provided an optical scanning device, which is provided with:

a light source;

a scanning system which deflect the beam emitted by the light source to scan;

a light receiving unit having a plurality of light receiving elements arranged in a direction in which the scanning beams scans, a light receiving signal being output by each of the light receiving elements upon incident of the scanning beam;

a signal adding system that adds the light receiving signals output by the plurality of light receiving elements to generate an added signal;

a clock signal generating system that generates a clock signal based on the added signal, the clock signal corresponding to a scanning speed of the scanning beam;

a delay signal generating unit that generates a delay signal defining a delay period during which the clock signal is ignored, the delay signal being generated based on light receiving signals output by a part of the plurality of light receiving elements which are located on upstream side of a scanning direction of the scanning beam; and an SOS signal generating circuit which generates a synchronizing signal based on the clock signal and the delay signal.

Optionally, the clock signal generating system may include: a resonance amplifier that resonance-amplifies the added signal; and a comparator that compares an amplitude of output of the resonance amplifier with a predetermined reference value, and outputs a comparison result, the SOS signal generating circuit is allowed to output the SOS signal after the delay signal has been received, and the delay signal may generate the delay signal such that output of the SOS signal by the SOS signal generating circuit is inhibited until the output of the resonance amplifier would be stabilized.

In this case, the SOS signal generating circuit may generate the synchronizing signal in response to a rising edge of the clock signal which immediately comes after a falling edge of the clock signal which comes after the end of the delay signal.

BRIEF DESCRIPTION OF THE ACCOMPANYING DRAWINGS

FIG. 1 shows a configuration of an LSU (Laser Scanning Unit) to which the present invention is applicable;

FIG. 2A schematically shows a structure of a PD (Photo Diode) according to a first embodiment of the invention;

FIGS. 7A–7G show a timing chart illustrating generation of the SOS signal;

FIGS. 9A–9G show a timing chart illustrating generation of a delay signal;

Figure 11:
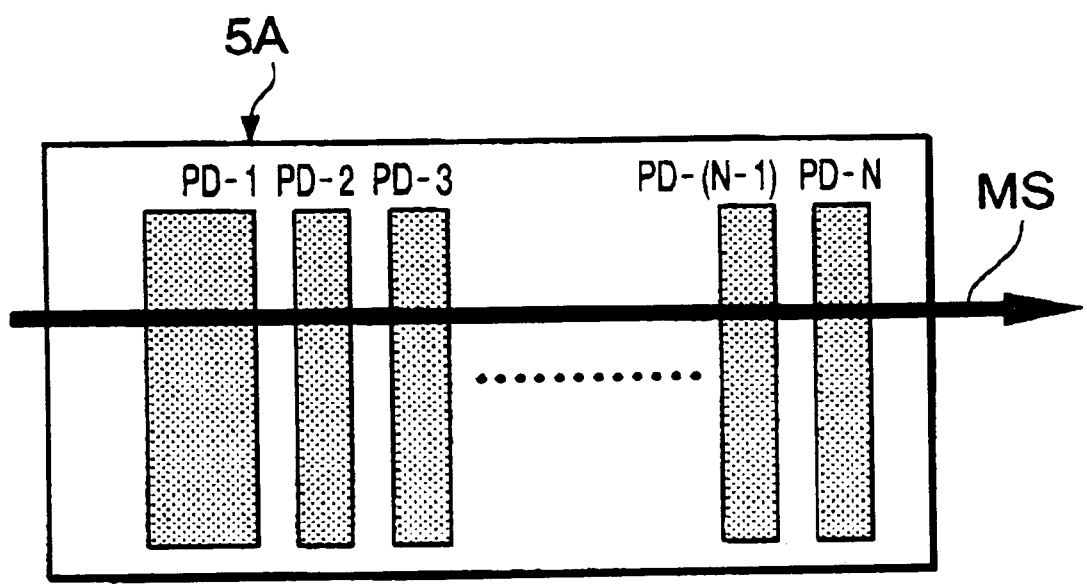
Figure 12:
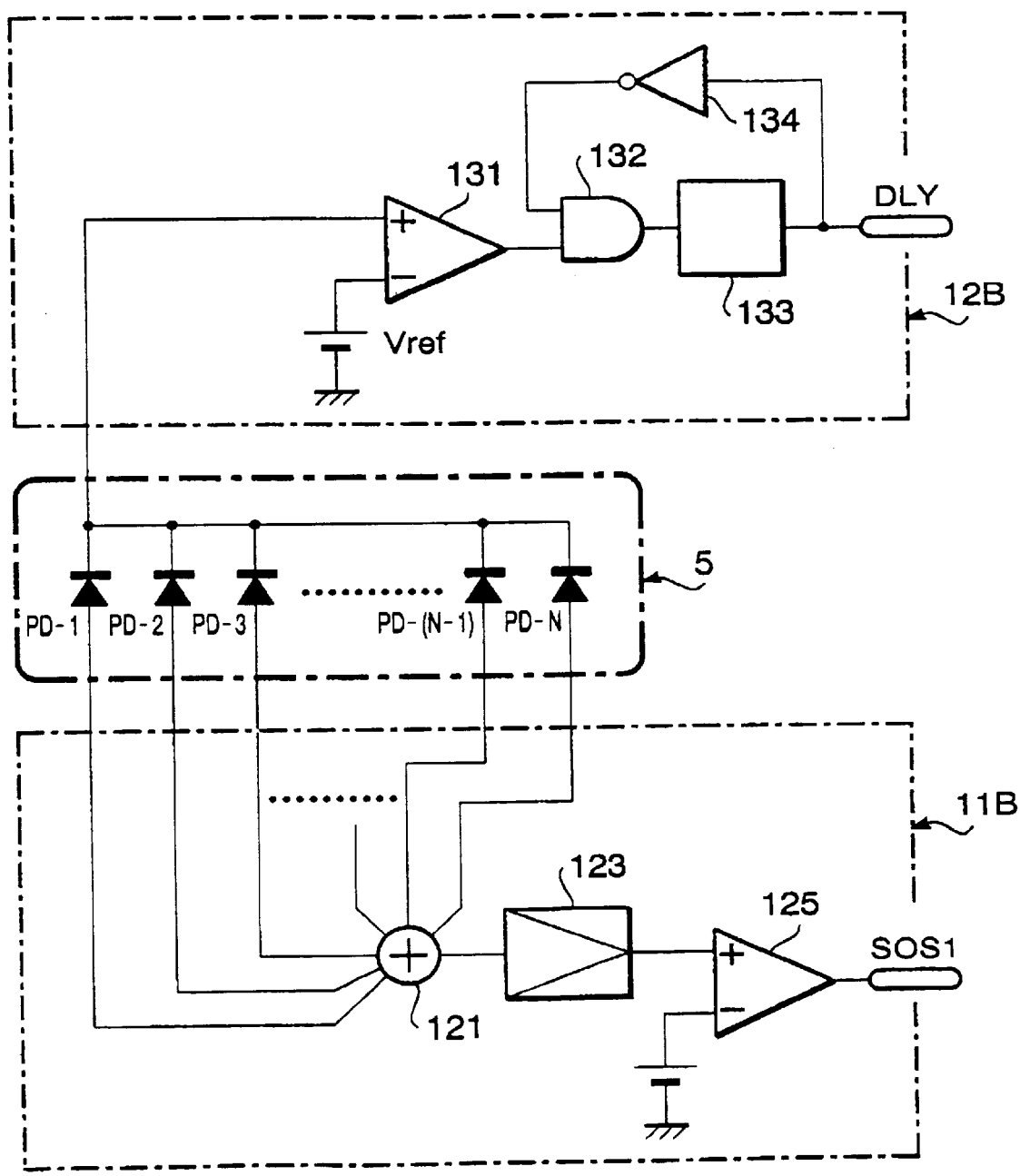
Figure 15:
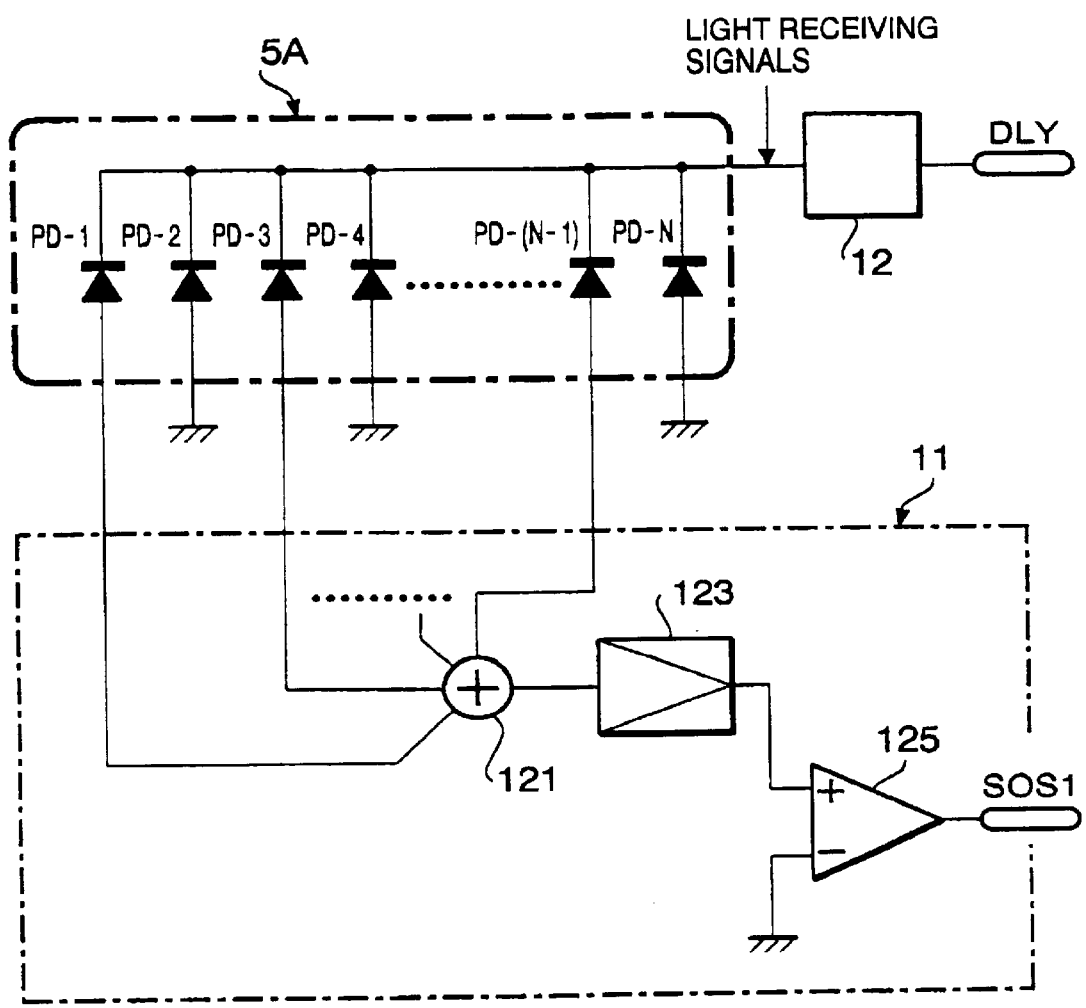

FIG. 11 schematically shows a structure of a PD (Photo Diode) according to a third embodiment of the invention;

FIG. 12 is a block diagram of an SOS signal generating circuit according to a third embodiment of the invention;

FIGS. 13A–13E show a timing chart illustrating generation of a DLY signal;

FIGS. 14A–14F show a timing chart illustrating generation of a clock signal and the SOS signal;

FIG. 15 shows a configuration of a clock signal generating unit according to a modification of the third embodiment; and FIGS. 16A–16F show a timing chart illustrating generation of a clock signal according to the modification of the third embodiment.

DESCRIPTION OF THE EMBODIMENTS

The present invention will be described with reference to the accompanying drawings.

Figure 1:
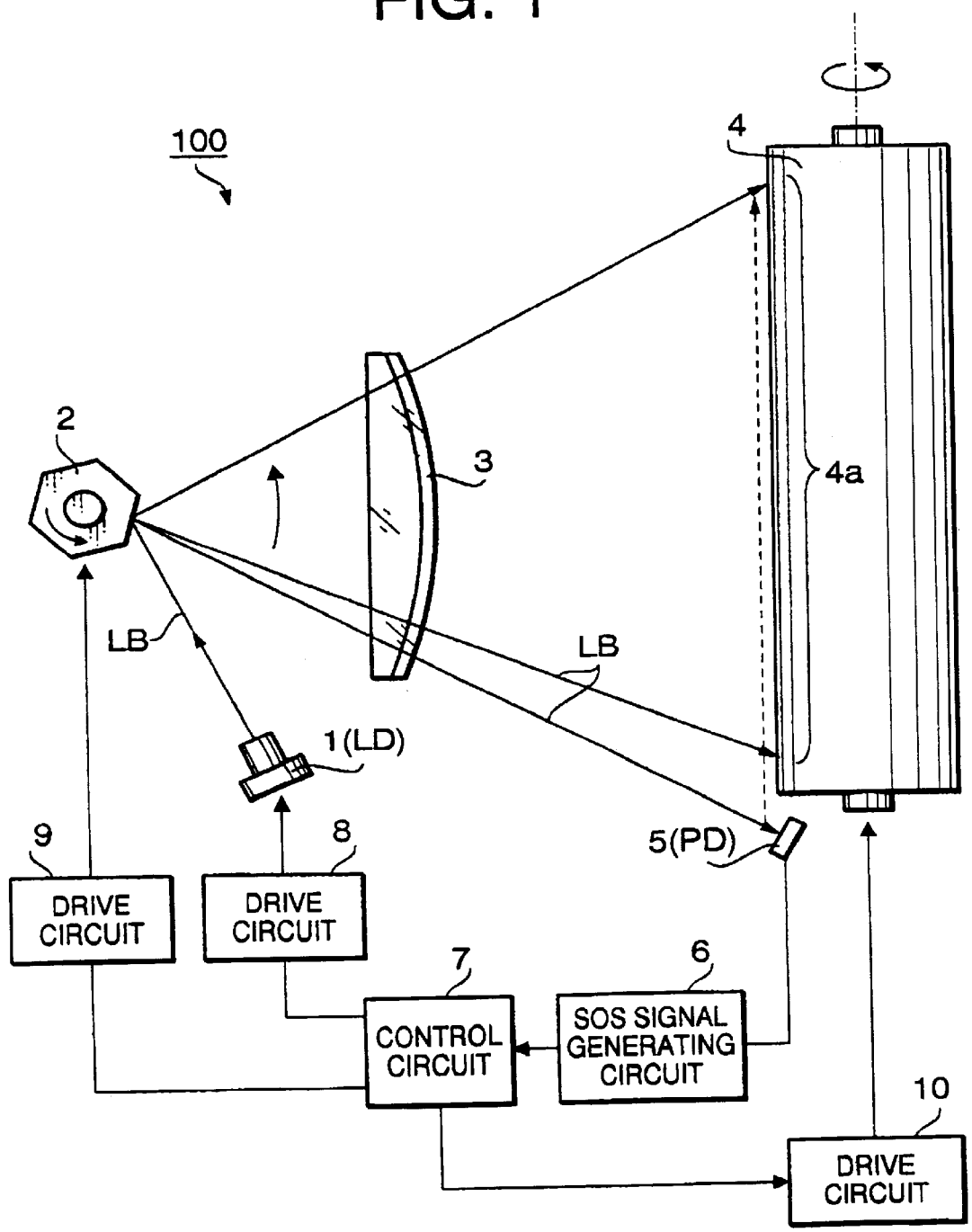

Each of the embodiments described hereinafter is applicable to an LSU (Laser Scanning Unit) 100 shown in FIG. 1.

In the LSU 100, a photo diode (PD) unit 5 is provided to receive a scanning beam at a position out of the imaging area 4a of a photoconductive drum 4. Based on the output of the photo diode unit 5, an SOS signal generating circuit 6 generates an SOS signal, which is transmitted to a control circuit 7. The control circuit 7 controls an LD (Laser Diode) drive circuit 8 to start modulating a laser beam emitted by a laser diode (LD) 1 in accordance with the input SOS signal so that the image is formed within the imaging area 4a. Further, the control circuit 7 controls a polygonal mirror drive circuit 9 and a photoconductive drive circuit 10. The laser beam LB emitted by the laser diode 1 is deflected by the polygon mirror 2, and scans the photoconductive drum 4 via an fθ lens 3. With the above configuration, on the imaging area 4a on the photoconductive drum 4, an image is formed synchronously with the SOS signal.

First Embodiment

Figure 2A:
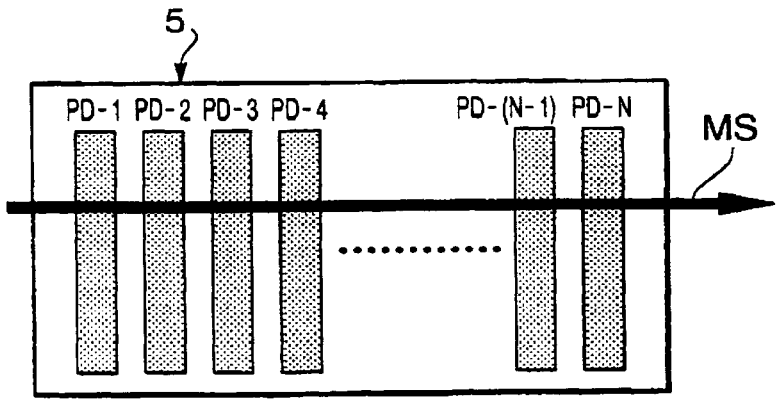
FIG. 2B is a block diagram of an SOS signal generating circuit.
Figure 2B:
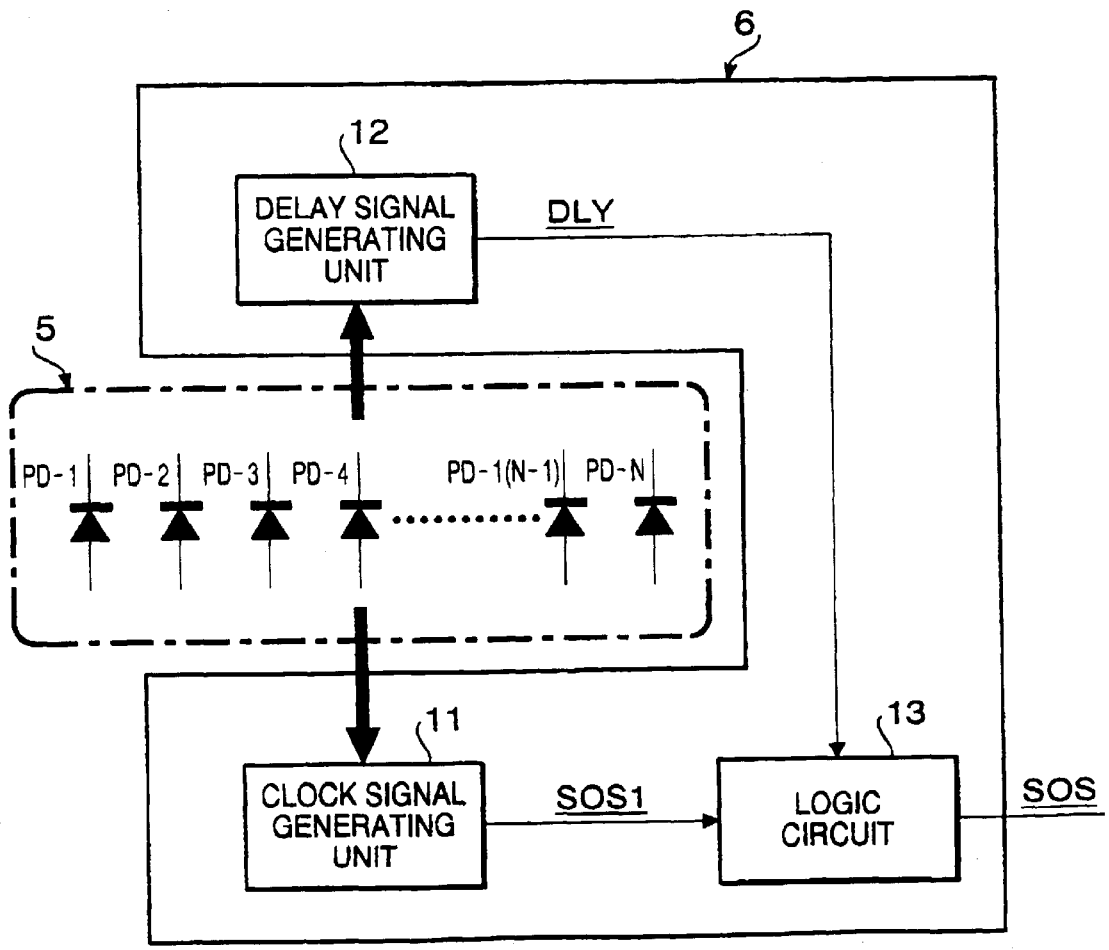

FIG. 2A schematically shows a structure of a the photo diode unit 5 according to a first embodiment, and FIG. 2B is a block diagram illustrating the SOS generating circuit 6 to which the present invention is applied.

The photo diode unit 5 has a plurality of PD elements PD1–PDN (N is an integer greater than 1), which are arranged in a scanning direction (i.e., the main scanning direction) MS of the laser beam LB at a predetermined interval. In the embodiments, the main scanning direction refers to a direction from left-hand side to right-hand side along the line MS. In the first and second embodiments, for the sake of simplicity, description will be given on assumption that N equals 10. From each of the PD elements PD1–PDN, due to photoelectric conversion, a pulse-shaped signal (which will be referred to as a light receiving signal) is output. In the embodiments, the pitch of the PD elements PD1–PDN (i.e., the interval between adjoining PD elements) is set to be 31 micrometer in the main scanning direction.

As shown in FIG. 2B, the SOS generating circuit 6 includes:
a clock signal (SOS1) generating unit 11;
a delay signal generating unit 12 for generating a delay signal DLY which is used for determining a start of the SOS signal; and
a logic circuit 13 for receiving the clock signal SOS1 and the delay signal DLY, and applying logical operation thereto to output the SOS signal.

Figure 3:
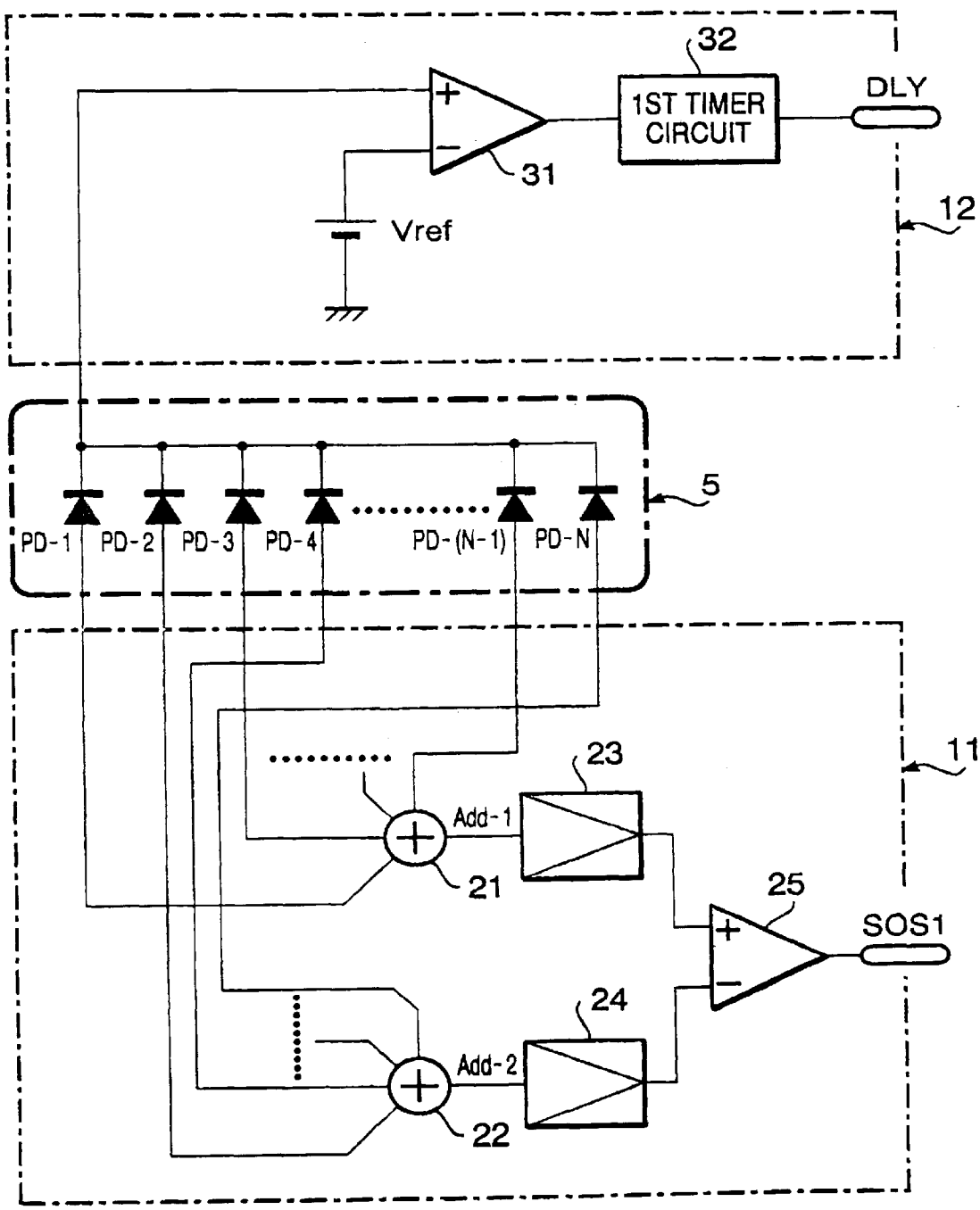
FIG. 3 is a block diagram of an SOS signal generating circuit according to a first embodiment of the invention.

FIG. 3 is a block diagram showing the PD unit 5, the clock signal (SOS1) generating unit 11, the delay signal generating unit 12, and the connection therebetween. There are ten PD elements PD1–PDN (N=10) included in the PD unit 5, which are divided into two groups: an odd-numbered group: PD1, PD3, PD5, PD7, PD9; and an even-numbered group: PD2, PD4, PD6, PD8 and PD10. Anodes of the odd-numbered PD elements PD1, PD3, PD5, PD7, PD9 are connected to a first adder 21, and anodes of the even-numbered PD elements PD2, PD4, PD6, PD8, PD10 are connected to a second adder 22. Thus, the light receiving signals output by the PD elements included in each group are added (synthesized). Output terminals of the adders 21 and 22 and connected to input terminals of first narrow band and second narrow band amplifiers 23 and 24, respectively. Thus, narrow-band amplification is applied to each of the added signals. Each of the narrow band amplifiers 23 and 24 is constituted as an amplifier provided with an LC resonance circuit. The resonance frequency coincides with a frequency which substantially corresponds to a period at which the PD elements PD1, PD3, PD5, PD7, PD9 receive the scanning laser beam and output the pulses as well as a period at which the PD elements PD2, PD4, PD6, PD8, PD10 receive the scanning laser beam and output the pulses. The output terminals of the narrow band amplifier 23 and 24 are connected to positive and negative input terminals of a first comparator 25, where the outputs of the narrow band amplifiers 23 and 24 are compared, and a cross point signal indicating times at which the waveforms of the outputs of the resonance amplifiers 23 and 24 cross is output. Since the pitch of the PD elements PD1–PDN is a fixed value, and the laser beam scans across the PD elements at a constant speed, the cross point signal is generates as a clock signal having periodical pulses. Hereinafter, the cross point signal is also referred to as the clock signal and/or SOS1 signal.

Cathodes of the all the PD elements PD1–PDN are connected to the delay signal generating unit 12. As shown in FIG.3, the sum of all the PD elements PD1–PDN is obtained, and transmitted to the positive input terminal of a second comparator 31. To the negative input terminal of the second comparator 31, a reference voltage Vref is applied. Thus, the sum of the outputs of the PD elements is compared with the reference voltage Vref, and the comparison result is output by the second comparator 31.

Further, the output of the second comparator 31 is input to a first timer circuit 32. The first timer circuit 32 is triggered by the H level output of the second comparator 31, and outputs a delaying signal (DLY signal) upon receipt of the H level output from the second comparator 31 for a predetermined period.

Figure 4:
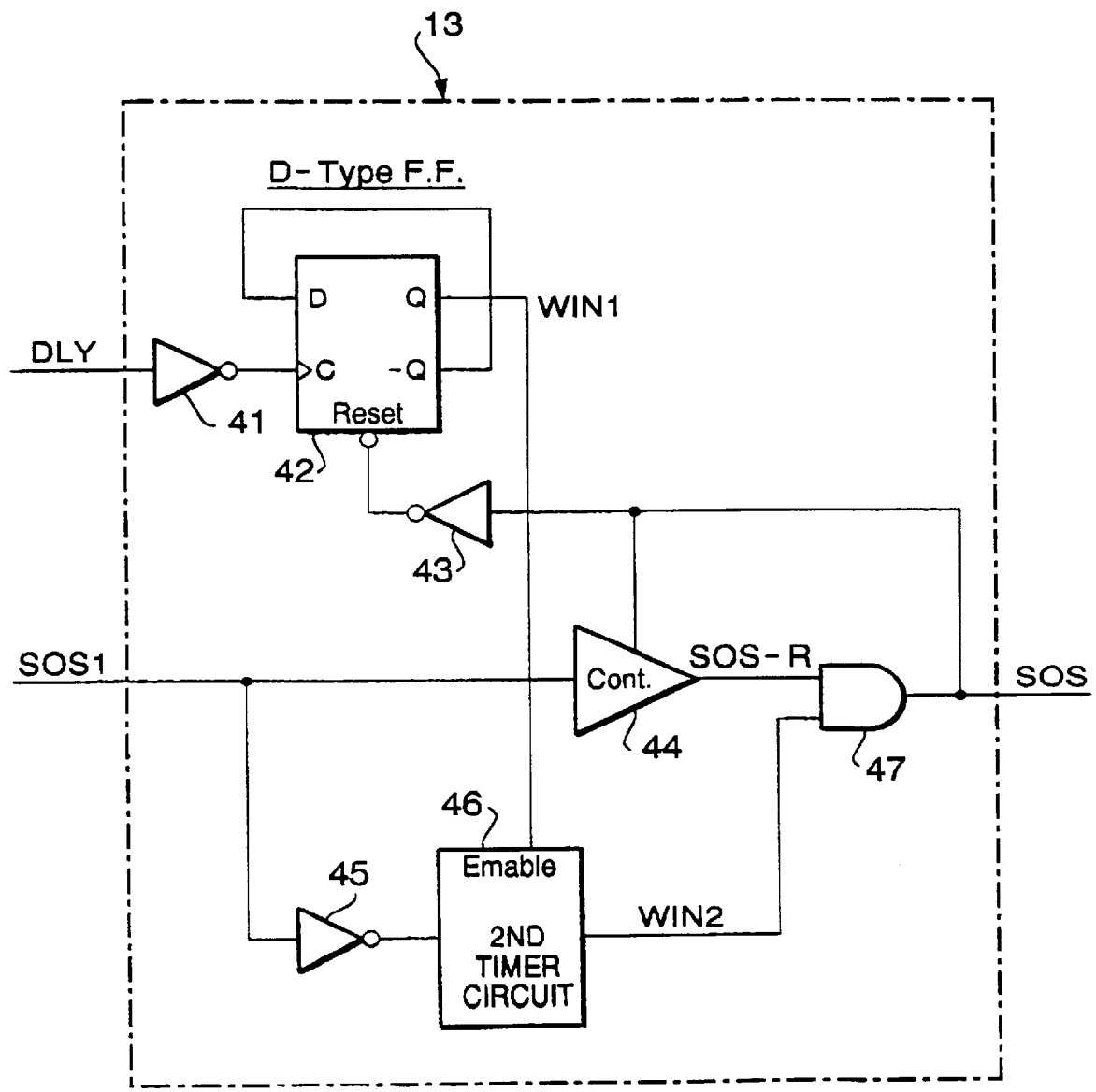
FIG. 4 shows a logic circuit employed in the SOS signal generating circuit.

As shown in FIG. 4, the logic circuit 13 is provided with a D-type Flip Flop (hereinafter, referred to as D-FF) 42. The DLY signal is input to the C terminal of the D-FF 42 via an inverter 41. The negative output (–Q) of the D-FF 42 is fed back to the data input terminal (D) thereof. Thus, the positive output Q signal (hereinafter referred to as WIN1 signal) of the D-FF 42 is reversed upon input of the DLY signal.

To a reset terminal of the D-FF 42, the SOS signal is input via an inverter 43, and the D-FF 42 is reset by the SOS signal.

The logic circuit 13 is further provided with a latch 44 to which the cross point signal (i.e., the SOS1 signal) is input, and a second timer circuit 46 to which the SOS1 signal is input via an inverter 45. The outputs of the latch 44 (SOS-R) and the second timer circuit 46 (WIN2) are respectively input to input terminals of a first AND gate 47, respectively, and the SOS signal is output from the first AND gate 47.

The WIN1 signal output by the D-FF 42 is input to an enable terminal of the second timer circuit 46. When the WIN1 signal is input, the second timer circuit 46 is triggered and starts operating. Thus, the WIN1 signal is an enabling signal which enables the operation of the second timer circuit 46. To a control terminal CONT of the latch 44, the SOS signal is input. The latch 44 outputs the input signal as it is when the SOS signal input to the control terminal is L level, while holds the input signal level when the SOS signal input to the control terminal is H level.

Next, operation of the SOS generating circuit 6 will be described with reference to timing charts shown in FIGS. 5A–5F, 6A–6G, and 7A–7G.

Figure 5A:
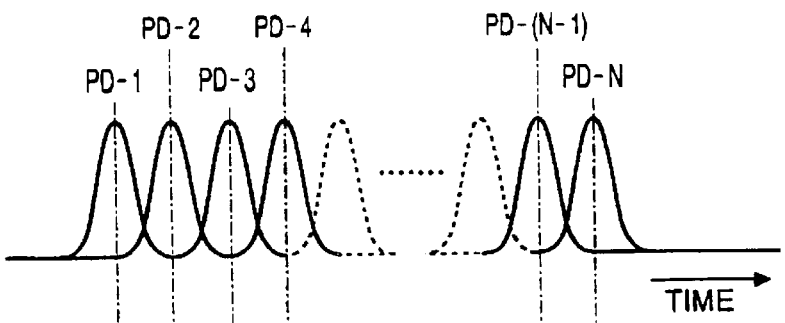
FIGS. 5A–5F show a timing chart illustrating generation of a DLY signal.

When the laser beam LB scans the photo diode unit 5, each of the PD elements PD1–PDN outputs a pulse-like light receiving signal. FIG. 5A shows all the light receiving signals output by all the PD elements PD1–PDN.

Figure 5B:
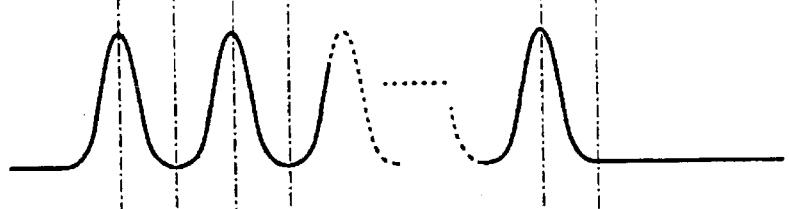
Figure 5C:
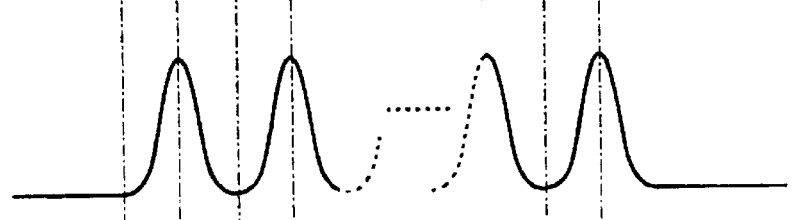

Since the first adder 21 synthesizes the light receiving signals output by the odd-numbered PD elements, the output of the first adder 21 represents a signal having a plurality of pulses at a predetermined interval, as shown in FIG. 5B. Similarly, since the second adder 22 synthesizes the light receiving signals output by the even-numbered PD elements, the output of the second adder represents a signal having a plurality of pulses at a predetermined interval, as shown in FIG. 5C. The waveform of the output signal of the second adder 22 is substantially the same as the waveform of the output signal of the first adder 21. Further, the waveform of the output signal of the second adder 22 is shifted by ½ period with respect to the waveform of the output signal of the first adder 21.

Figure 5D:
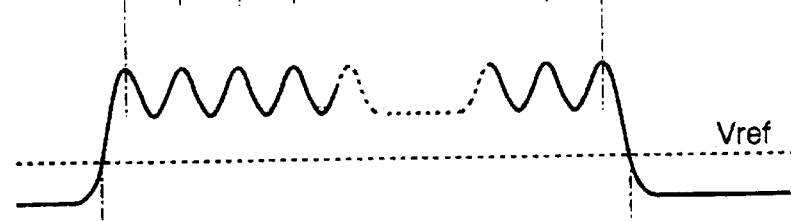
Figure 5E:
Figure 5F:

Since the delay signal generating unit 12 sums all the light receiving signals output by the PD elements PD1–PDN, the output thereof, which will be referred to as a PD sum signal, has a waveform as shown in FIG. 5D. The second comparator 31 compares the PD sum signal with a predetermined reference value Vref (see FIG. 5D), and outputs a signal whose value is H level only when the value of the PD sum signal is greater than the reference value Vref (see FIG. 5E). It should be noted that the level of the Vref is determined such that Vref is smaller than the PD sum signal when the PD elements PD1–PDN subsequently output the light receiving signals. When the output of the second comparator 31 is changed from L level to H level (at the rising edge of the waveform shown in FIG. 5E), the first timer circuit 32 is driven to measure a predetermined period during which the output thereof is maintained at H level. The output of the first timer circuit 32 is the DLY signal, and the predetermined period during which the DLY signal is output is referred to as a delay period. It should be noted that the first timer 32 is provided for outputting the H level signal for the delay period in response to the rising edge of the output of the second comparator 31.

Figure 6A:
FIGS. 6A–6G show a timing chart illustrating generation of a clock signal and the SOS signal.
Figure 6B:
Figure 6C:
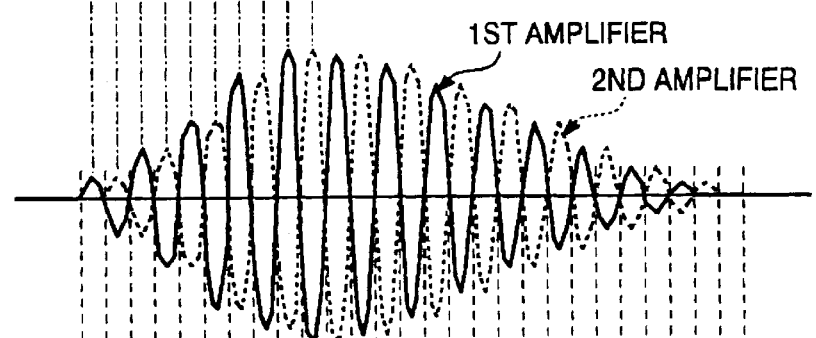

FIGS. 6A and 6B show the output of the first and second adders 21 and 22 (which are similar to FIGS. 5B and 5C). When the outputs of the first and second adders 21 and 22 are amplified with the first and second narrow-band amplifiers 23 and 24, respectively, resonance amplified signals as shown by solid and broken lines in FIG. 6C are obtained, respectively. It should be noted that the waveforms shown in FIG. 6C are exemplary ones, and the actual waveforms of the resonance amplified signals depend on the amplitude and phase characteristics of the narrow-band amplifiers 23 and 24.

As shown in FIG. 6C, each resonance amplified signal has a waveform such that the light receiving signals are accumulated with time in accordance with the resonance amplifying characteristics of the narrow-band amplifiers 23 and 24. Thus, after the input of the light receiving signals is terminated, the resonance amplified signals remain output. The light receiving signals have phase differences corresponding to the pitch of the PD elements PD1–PDN. Therefore, the two resonance amplified signals have a phase difference of 180 degrees. By comparing the two resonance amplified signals using the first comparator 25, the SOS1 signal (i.e., the clock signal) whose value alternates between H and L levels at cross points of the waveforms of the two resonance amplified signals is obtained as shown in FIG. 6D.

Figure 6D:

FIG. 7A also shows the SOS1 signal which is similar to that shown in FIG. 6D. In the logic circuit 13, the D-FF 42 reverses the WIN1 signal (i.e., the enabling signal) at the falling edge of the DLY signal (see FIGS. 7C and 7D). When the WIN1 signal is H level, the second timer circuit 46 becomes ready to detect the signal input thereto since the WIN1 signal is the enabling signal as described before. In this condition, if the falling edge of the SOS1 signal (see FIG. 7A) is detected, i.e., if the rising edge of the inverted SOS1 signal output from the inverter 45 is input to the second timer circuit 46, the second timer circuit 46 starts operating and the signal output therefrom (i.e., signal WIN2) becomes H level (see FIG. 7E). The SOSI signal is also input to the latch 44. At this stage, since the SOS signal input to the control terminal CONT is L level, the output signal of the latch 44 (i.e., SOS-R signal) is similar to the SOS1 signal (see FIG. 7B), which is input to the AND gate 47.

As described before, when the signal WIN2 becomes H level, the SOS1 signal is output as the SOS signal via the AND gate 47. Thus, the WIN2 signal functions as a-gate signal which defines the timing when the SOS-R signal input to the AND gate 47 is output therefrom. When the SOS signal becomes H level, the D-FF 42 is reset, which inhibits signal input to the second timer circuit 46, and accordingly the second titer circuit 46, which was triggered by the falling edge of the SOS1 signal, will not be triggered. Accordingly, as shown in FIG. 7F, after the falling edge of the DLY signal, the SOS signal starts at the rising edge of the SOS1 signal (at time 5) immediately after the falling edge of the SOS1 signal (at time a) which triggers the second timer circuit 46, and the SOS signal maintains H level for the predetermined period that is preset to the second timer circuit 46. It should be noted that the period during which the second timer circuit 46 outputs the H level SOS signal defines the length of the SOS signal. The length of the SOS signal is determined depending on a scanning speed of the laser beam, and should be sufficiently shorter than a period for one scanning operation. At the rising edge of the SOS signal, the SOS-R signal is held at H level. By repeating the above operation, the SOS signal accurately corresponding to the scanning period of the laser beam can be generated as shown in FIG. 7G. It should be noted that a scale of FIG. 7G is different from the scale of FIGS. 7A–7F.

Figure 6E:
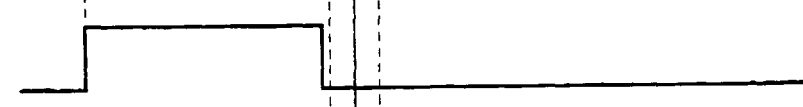
Figure 6F:
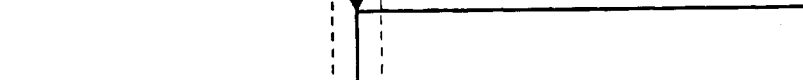
Figure 6G:

The advantage in utilizing the DLY signal will be described. The resonance amplified signals amplified by the narrow-band amplifiers 23 and 24 have relatively small amplitudes at the beginning and ending portions thereof as shown in FIG. 6C. Thus, in the beginning and ending portions, only a small change of the waveforms may greatly affect the timing of the rising edge (i. e., the starting timing) of the SOS signal. Therefore, in order to obtain the stabilized or reliable SOS signal, it is preferable to use the intermediate area of the resonance amplified signals. For this purpose, the DLY signal is generated as shown in FIG. 6E, and the first timer circuit 32 is set to measure apredetermined period during which the DLY signal is kept at H level. The predetermined period (i.e., the delay period) is set such that the rising edge of the SOS1 signal after the falling edge of the DLY signal corresponds the accurate timing for the SOS signal, and the SOS signal is generated to have the rising edge at the timing set as above.

In the above first embodiment, the DLY signal remains at H level until the time when the resonance amplified signals have maximum amplitude, i.e., while the light receiving signals shown in FIGS. 6A and 6B are being output. With this setting, when the DLY signal is changed to L level, the resonance amplified signals have the maximum amplitudes. In other words, the DLY signal remains at H level so that, at the falling edge of the DLY signal, the resonance amplified signals are stabilized.

It is preferable that the DLY signal is changed from H level to L level at least until the amplitude of the resonance amplified signals equal a half of the maximum value. In particular, it is preferable that the DLY signal is changed to L level within a range of one wavelength before and after a point of time when the outputs of the narrow-band amplifiers 23 and 24 have maximum values.

In the first embodiment, the timer circuit 32 is set such that the DLY signal is changed from H level to L level at a time approximately one wavelength before the resonance amplified signals have the maximum values. The resonance amplified signals are considered to be stable at the portion where the DLY signal is changed to L level, and based on the resonance amplified signals around the portion, the stabilized SOS signal can be generated.

It should be noted that the timing of the rising edge of the SOS signal is defined by the falling edge of the SOS1 signal after the falling edge of the DLY signal appears. Therefore, an error in time measuring of the second timer circuit 36 does not affect the timing of the rising edge (i.e., start) of the SOS signal.

As described above, according to the first embodiment, the light receiving signals output by the PD unit 5 are resonance-amplified with the narrow-band amplifiers 23 and 24, and the SOS signal is generated based on the resonance amplified signals. Due to amplitude and phase characteristics of the narrow-band amplifiers 23 and 24, the signals output by the adders 21 and 22 may sometimes be amplified to have waveforms of dissimilar amplitude. However, the timing at which the scanning beam scans the PD elements corresponds to the cross points of waveforms of the resonance amplified signals, and therefore by detecting a certain point of the resonance amplified signals as an SOS timing, the SOS signal having an accurate timing can be generated.

In the first embodiment, the DLY signal is output for a predetermined period after the light receiving signals output by the PD unit 5 have reached a predetermined level. Thus, it is possible to utilizing only the beginning portion of the light receiving signals to generate the DLY signal.

Second Embodiment

Figure 8:
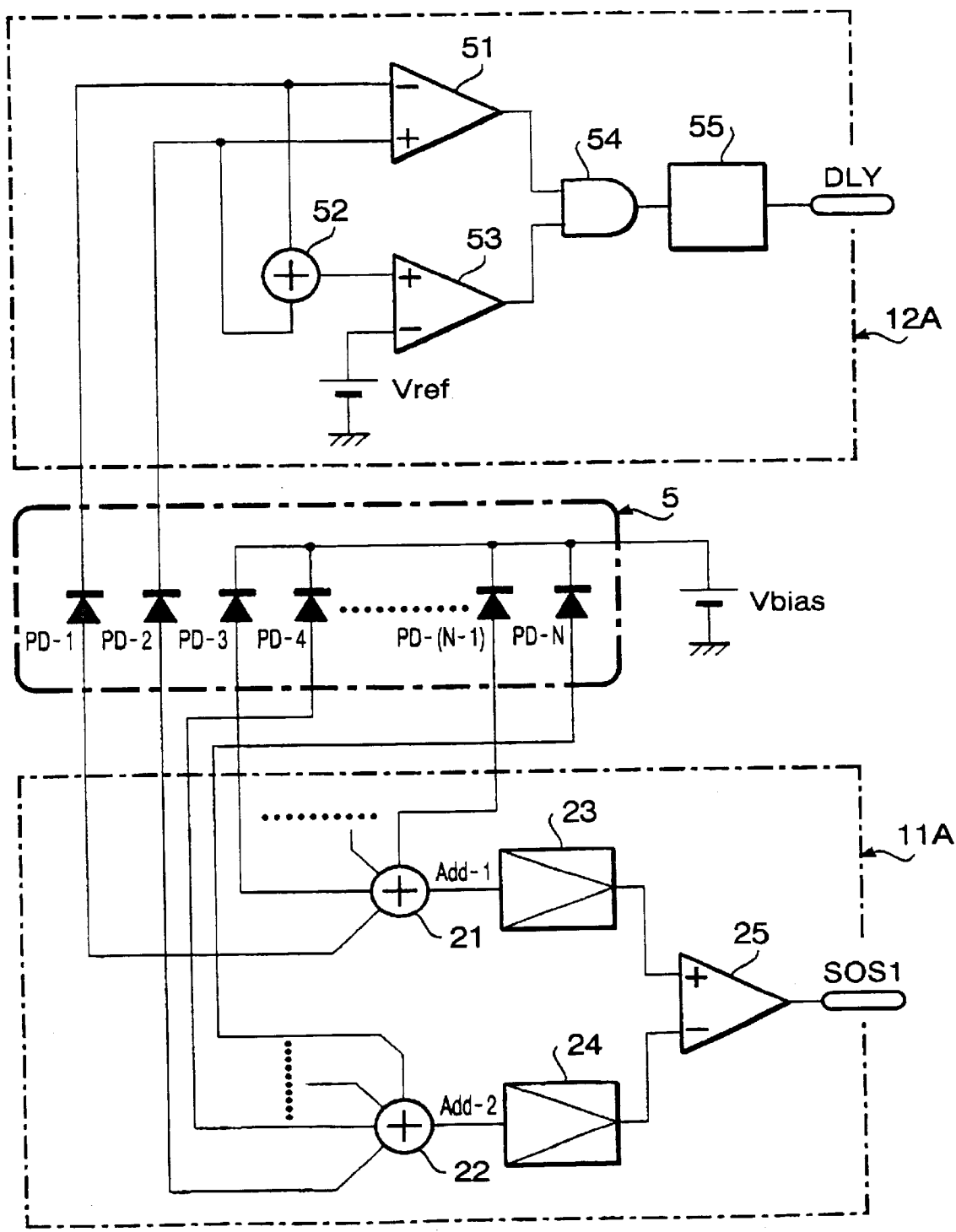
FIG. 8 shows a block diagram of an SOS signal generating circuit according to a second embodiment of the invention.

FIG. 8 shows an example of the SOS signal generating circuit according to a second embodiment of the invention.

A clock signal generating unit 11A is the same as the clock signal generating unit 11 in the first embodiment, i.e., the clock signal generating unit 11A is provided with the first and second adders 21 and 22, the first and second narrow band amplifiers 23 and 24, and the first level comparator 25. Since the function of the clock signal generating unit IIA in FIG. 8 is identical to that in the first embodiment, description thereof is omitted.

In the second embodiment, cathodes of the first two. PD elements PD1 and PD2 of the PD unit 5 are connected to a delay signal generating unit 12A. The cathodes of the other PD elements are connected to the power source Vbias for supplying the biasing voltage.

In the delay signal generating unit 12A, the cathodes of the PD elements PD1 and PD2 are connected to the input terminals of a second comparator 51. Further, outputs from the cathodes of the PD elements PD1 and PD2 are added (synthesized) by a third adder 52 and input to one of the input terminals of a third comparator 53. To the other input terminal of the third comparator 53, a reference voltage Vref is applied. The outputs of the second comparator 51 and the third comparator 53 are applied to the AND gate 54, output of which is input to a first timer circuit 55. The output of the first timer circuit 55 is used as the DLY signal.

FIGS. 9A–9G show a timing chart illustrating a relationship between various signals.

FIG. 9A shows the light receiving signal output by the PD elements PD1–PDN. FIG. 9B shows the two light receiving signals respectively output by the PD elements PD1 and PD2. The second comparator 51 outputs a signal indicating the cross points of the waveforms of signals output by the PD elements PD1 and PD2 as shown in FIGS. 9B and 9C. The output of the third comparator 53 is H level when the added light receiving signals output by the PD elements PD1 and PD2 is greater than the reference voltage Vref, otherwise L level signal is output by the third comparator 53 as shown in FIGS. 9D and 9E. It should be noted that the reference voltage Vref should be sufficiently small so that a condition where the PD elements PD1 and PD2 respectively receive the light beam and another condition where the both of the PD elements PD1 and PD2 do not receive the light beam can be distinguished. The AND gate 54, to which the signals shown in FIGS. 9C and 9E are applied, outputs a signal shown in FIG. 9F. The rising edge of the signal shown in FIG. 9F represents the cross point of the light receiving signals output by the PD elements PD1 and PD2. As shown in FIG. 9G, the DLY signal is set to H level at the rising edge of the output signal of the AND gate 54 (see FIG. 9F), and the H level is maintained for a predetermined period. As described above, in the delay signal generating unit 12A, a cross point between the light receiving signals of the PD elements PD1 and PD2 is detected, and the first timer circuit 55 is triggered in response to the detection of the cross point. Thus, the timing when the first timer circuit 55 is started can be determined accurately in comparison with the delay signal generating circuit according to the first embodiment.

In the above-described embodiments, the SOS signal is generated using ten PD elements. However, the number of the PD elements need not be limited to ten. If a greater number of PD elements are used, the amplitude of the resonance amplified signal may be greater. However, what is important is a stability of the amplitude, and the number of the PD elements should be determined in this regard. That is, a suitable number of the PD elements should be used in accordance with the timing accuracy of the SOS signal required for the LSU.

Figure 10A:
FIGS. 10A–10G show a timing chart illustrating generation of a clock signal when a gain of the narrow band amplifier is saturated.
Figure 10B:
Figure 10C:
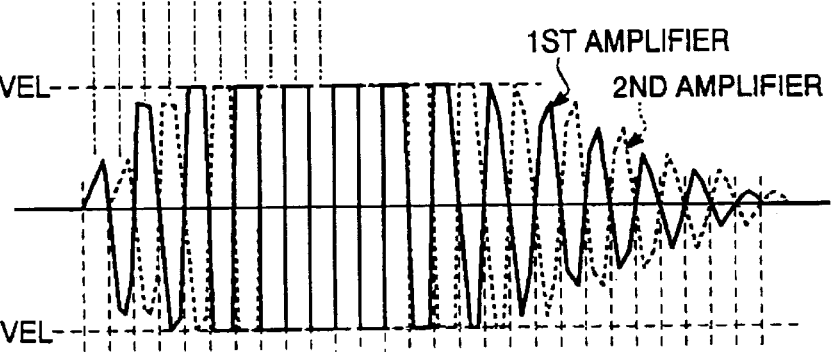
Figure 10D:
Figure 10E:
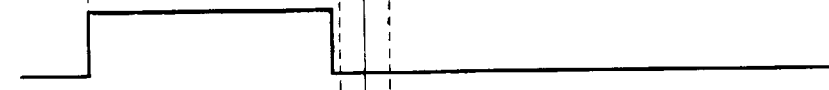
Figure 10F:
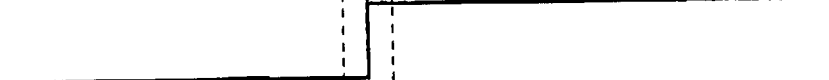
Figure 10G:

In FIG. 10C, another example of the resonance amplified signals are shown. The signals shown in FIGS. 10A–10G are similar to those shown in FIGS. 6A–6G except that the signals shown in FIG. 10C are saturated, while the signals shown in FIG. 6C are not saturated. As shown in FIGS. 10C and 10D, even if the signals are saturated, a desired SOS signal can be generated because SOS1 signal is generated according to cross points of the two resonance-amplified signals. According to another point of view, if the signals have a certain amplitude, the desired SOS signal can be generated regardless whether the signals are saturated or not.

Third Embodiment

FIG. 11 shows configurations of the photo diode SA according to a third embodiment of the invention. The photo diode unit 5A is similar to that shown in FIG. 2A except that the width of the first PD element PD1 is greater than the other PD elements. Further, the third embodiment will be described on assumption that the number of the PD elements is 5. Similarly to the first and second embodiments, the pitch of the PD elements PD1–PDN is set to be 31 micrometer in the main scanning direction MS in FIG. 11.

FIG. 12 is a block diagram showing the PD unit 5A, the clock signal generating unit 11B, the delay signal generating unit 12B and the connection therebetween. Anodes of the PD elements PD1–PD5 are connected to an adder 121. Thus, all the light receiving signals output by the PD elements PD1–PDN are synthesized. To an output terminal of the adder 121, a narrow band amplifier 123 is connected. Thus, narrow-band amplification is applied to the added signal. The narrow band amplifier 123 is similar to the first narrow band amplifier 23 of the first and the second embodiments. The resonance frequency coincides with a frequency which substantially corresponds to a period at which the PD elements PD1–PD5 receive the scanning laser beam and output the pulses.

The output terminal of the narrow band amplifier 123 is connected to a positive input terminal of a first level comparator 125, where the output of the resonance circuit 123 is compared with a ground potential applied to the negative input terminal of the comparator 125, and the cross point signal (i.e., the SOS1 signal) indicating the output of the narrow band amplifier 123 is greater than the ground potential is output.

The delay signal generating unit 12B is constituted as shown in FIG. 12B. To a positive terminal of a second comparator 131, the cathodes of all the PD elements PD1–PDN are connected, while to the negative terminal of the second comparator 131, a reference voltage Vref is applied. The output of the second comparator 131 is input to one terminal of an AND gate 132. The output of the AND gate 131 is input to a first timer circuit 133. The output of the first timer circuit 133 is input to another terminal of the AND gate 132 via an inverter 134. Thus, the first timer circuit 133 is triggered by an H level output of the first and gate 132.

The first timer circuit 133 outputs a DLY signal, when triggered, for a predetermined period of time.

The logic circuit 13 is similar to that shown in FIG. 4 and description will be omitted.

Next, operation of SOS generating circuit 6 according to the third embodiment will be described with reference to timing charts shown in FIGS. 13A–13E and 14A–14F.

Figure 13A:
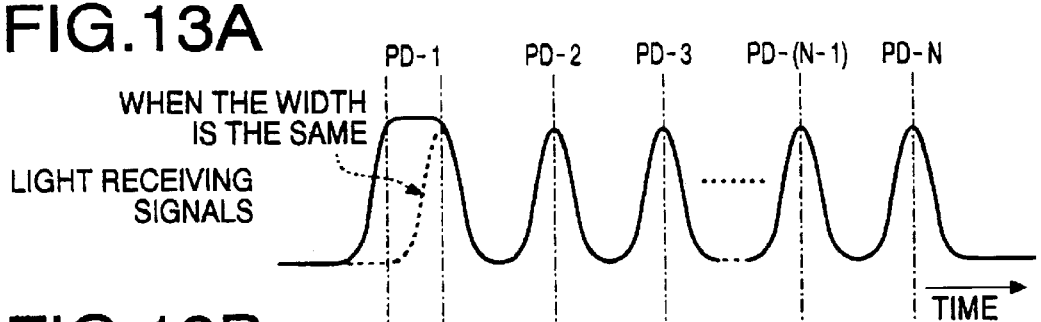

When the laser beam LB scans the photo diode unit 5A, each of the PD elements PD1–PDN output pulse-like light receiving signals. As shown in FIG. 13A, the light receiving signals are .output-by the PD elements PD1–PDN at different timings.

Figure 13B:
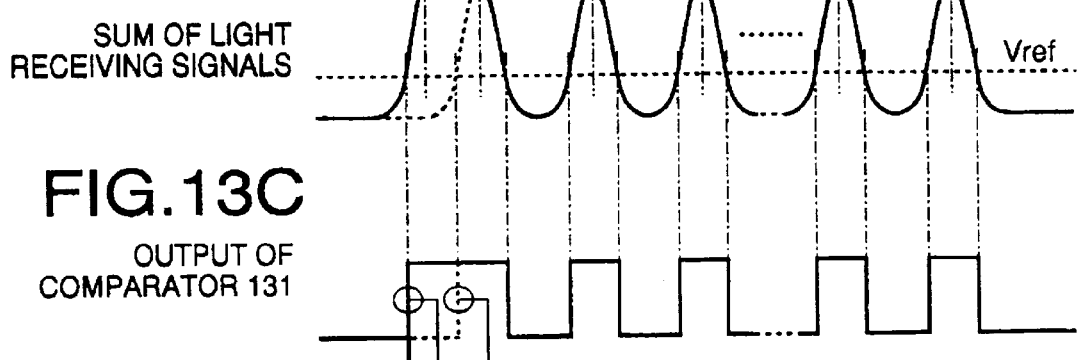
Figure 13C:

Since the cathodes of all of the PD elements PD1–PDN are connected together and to the positive terminal of the second comparator 131, the signal at the positive terminal of the second comparator 131 represents a signal having a plurality of pulses at a predetermined interval, as shown in FIG. 13B. The second comparator 131 compares the PD sum signal with a predetermined reference value Vref (see FIG. 13B), and outputs a signal whose value is H level only when the value of the PD sum signal is greater than the reference value Vref (see FIG. 13C).

Figure 13D:
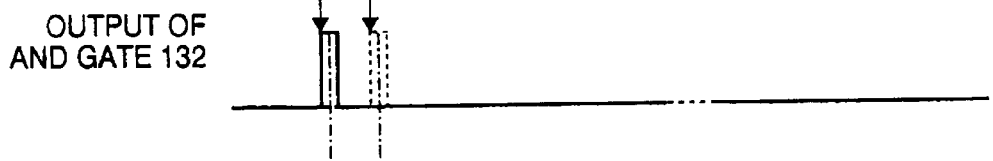
Figure 13E:

When the H level signal output by the second comparator 131 and output of the first timer circuit 133 via the inverter 134 are applied to the AND gate 132, the pulse signal shown in FIG. 13D is generated by the AND gate 132. The pulse signal shown in FIG. 13D triggers the first timer circuit 133 to output the H level for a predetermined period. The signal output by the first timer circuit 133, as shown in FIG. 13D, is referred to as the DLY signal.

As shown in FIG. 11, the width of the first PD element PD1 is configured to be wider than the other PD elements. Therefore, as indicated by solid lines in FIGS. 13A and 13B, the light receiving signal output by the PD element PD1 has a larger energy, which contributes to stabilize the waveform of the light receiving signal. Therefore, the timing at which the light receiving signal is greater than the reference value Vref is stabilized, and thus the rising edge of the pulse output by the second. comparator 131 appears at an accurate timing. Accordingly, the pulse signal shown in FIG. 13D, and the DLY signal shown in FIG. 13E can be generated at constant timing. Such a configuration is advantageous especially when the light receiving signals output by the PD elements are lowered due to a relatively high scanning speed of the laser beam and/or the lowered intensity of the laser beam.

In FIGS. 13A–13E, broken lines show the waveform when the width of the first PD element PD1 is the same as that of the other PD elements. In such a case, the light receiving signal has a relatively low energy in comparison with the case where the width of the PD element PD1 is greater, and accordingly, the timing of the DLY signal may have less stability.

Figure 14A:
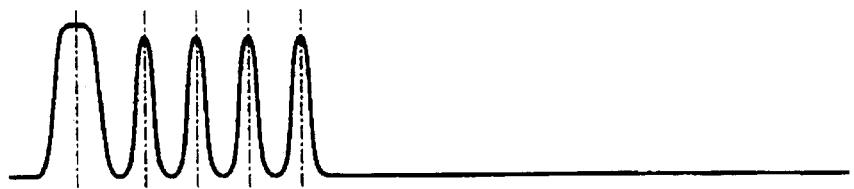
Figure 14B:
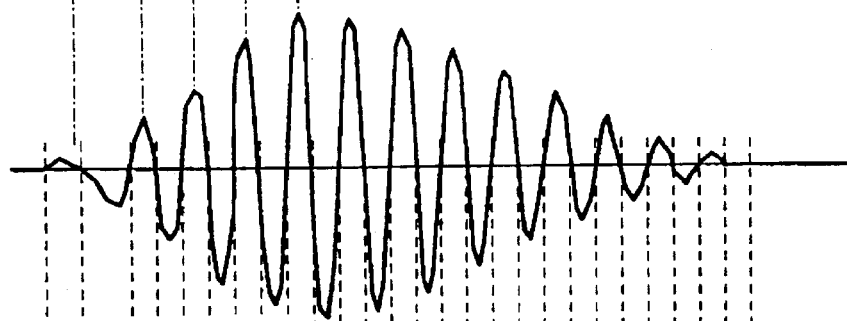

FIGS. 14A shows the output of the first adder 121 (which is similar to FIG. 13B). Since the first adder 121 synthesizes the light receiving signals output by the PD elements, the output of the adder represents a signal having a plurality of pulses at a predetermined interval, as shown in FIG. 14A. When the output of the first adder 121 is amplified with the narrow-band amplifier 123, resonance amplified signals as shown in FIG. 14B are obtained. The actual waveforms of the resonance amplified signals depend on the amplitude and phase characteristics of the narrow-band amplifier 122.

Figure 14C:
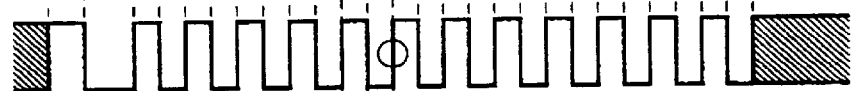
Figure 14D:
Figure 14E:
Figure 14F:

As shown in FIG. 14C, the resonance amplified signal has a waveform such that the light receiving signals are accumulated with time because of the resonance amplifying function of the narrow-band amplifier 122. Thus, after the input of the light receiving signals are finished, the resonance amplified signal remains output. By comparing the resonance amplified signal with a ground level using the first comparator 125, a signal whose value alternates between H and L levels at cross points of a zero cross points (i.e., cross points where the resonance amplified signal crosses the ground level). Thus generated signal is referred to as an SOS1 signal and shown in FIG. 14C.

With use of the signals described above, the SOS signal is generated similarly to the first embodiment (see FIGS. 7A–7G).

According to the third embodiment, in the clock signal generating unit, the SOS1 signal can be generated only by adding the light receiving signals output by a plurality of PD elements, resonance amplifying the added (synthesized) signal, and comparing the resonance amplified signal with the ground level. From thus generated SOS1 signal and the DLY signal, the SOS signal can be generated by a logic circuit. Therefore, the SOS signal generating circuit can be configured with a simple circuit structure.

In the third embodiment, the delay signal generating unit 12 is connected to the cathodes of the PD elements. This circuit can be modified such that the output of the adder 121 is input to the delay signal generating unit 12.

In the circuit shown in FIG. 12A, all the PD elements PD1–PDN are used. This can be modified such that a part of the PD elements are used. FIG. 15 shows an example of such a configuration. In FIG. 15, among the plurality of PD elements, only odd-numbered elements are used for generating the SOS1 signal. The cathodes of the even-numbered PD elements are grounded so as not to output signals or affect the adjoining PD elements. Functionally, the circuit shown in FIG. 15 is similar to the third embodiment. According to this modification of the third embodiment, by selecting appropriate positions and number of PD elements based on the required accuracy of the SOS signal for an LSU, a scanning speed and/or intensity of the laser beam, suitable light receiving signals can be obtained, and therefore, a desired SOS signal can be generated.

In the third embodiment, the SOS signal is generated using five PD elements. However, the number of the PD elements needs not be limited to five. If a greater number of PD elements are used, the amplitude of the resonance amplified signal may be greater. However, what is important is a stability of the amplitude, and the number of the PD elements should be determined in this regard. That is, a suitable number of the PD elements should be used in accordance with the timing accuracy of the SOS signal required for the LSU.

In FIGS. 16A–16F, the resonance amplified signals are shown. The signals shown in FIGS. 16A–16F are similar to those shown in FIGS. 14A–14F except that the signals shown in FIG. 16B are saturated, while-the signal shown in FIG. 14B is not saturated. As shown in FIGS. 16B–16F, even if the signal is saturated, a desired SOS signal can be generated. According to another point of view, if the resonance amplified signal has a certain amplitude, regardless whether saturated or not, the desired SOS signal can be generated.

The present disclosure relates to the subject matters contained in Japanese Patent Applications Nos. HEI 10-294758 and HEI 10-294759, both filed on Oct. 16, 1998, which are expressly incorporated herein by reference in their entireties.

What is claimed is:

1. An optical scanning device, comprising:
   a light source for emitting a light beam;
   a scanning system which deflects the beam emitted by said light source to scan;
   a light receiving unit having a plurality of light receiving elements arranged in a direction in which the scanning beams scans, a light receiving signal being output by each of said light receiving element upon incident of the scanning beam, said plurality of light receiving elements being divided into two groups such that every other light receiving element is fallen in the same group and adjoining light receiving elements are fallen in different groups;
   a resonance amplifying system that amplifies the light receiving signals of the light receiving elements of the two groups, respectively;
   a clock signal generating unit that generates a clock signal in accordance with the resonance amplified signals;
   a delay signal generating unit that generates a delay signal for generating a synchronizing signal in accordance with the light receiving signals output by at least part of said plurality of light receiving elements; and
   a logic circuit which generates the synchronizing signal based on the clock signal output by said clock signal generating unit and said delay signal output by said delay signal generating unit.

2. The optical scanning device according to claim 1, further comprising:
   a first adder that synthesizes the light receiving signals output by the light receiving elements fallen in one of said pair of groups; and
   a second adder that synthesizes the light receiving signals output by the light receiving elements fallen in the other one of said pair of groups, and
   wherein said resonance amplifying system includes:

a pair of narrow-band amplifiers that resonance amplify signals respectively output by said first and second adders; and a first comparator for comparing the resonance amplified signals output by said pair of narrow-band amplifiers, output signal of said first comparator being utilized as said clock signal.

3. The optical scanning device according to claim 2, wherein resonance frequencies of said pair of narrow-band amplifiers substantially coincide with the frequency of the sum of the light receiving signals output from said first and second adders, respectively.

4. The optical scanning device according to claim 3, wherein said delay signal generating unit comprises:

a second comparator that compares the sum of the light receiving signals output from all of said plurality of light receiving elements with a predetermined reference level; and a first timer circuit that is triggered in response to an output signal of said second comparator to output a delay signal for a predetermined period.

5. The optical scanning device according to claim 3, wherein said delay signal generating unit comprises:

a third comparator that compares the light receiving signals output by first two of said plurality of light receiving elements;

a fourth comparator that compares the sum of the output signals of said first two of said plurality of light receiving elements with a predetermined reference level;

an AND gate that applies AND operation to the outputs of said third and fourth comparators; and a third timer circuit that is triggered in response to an output signal of said AND gate to output a delay signal for a predetermined period.

6. The optical scanning device according to claim 4, wherein said logic circuit unit comprises:

an enabling signal output system that outputs an enabling signal upon end of the delay signal output by said delay signal generating unit;

a second timer that outputs, in accordance with the enabling signal and the clock signal output by said clock signal generating unit, a gate signal which is kept for a predetermined period; and a logic gate that outputs the synchronizing signal when said clock signal and said gate signal are input.

7. The optical scanning device according to claim 4, wherein the delay signal output by said delay signal generating unit is kept output at least when said light receiving signals are output by said plurality of light receiving elements.

8. The optical scanning device according to claim 7, wherein said delay signal is terminated by a point of time at which an amplitude of the output signal of each narrow-band amplifier is a half of the maximum value thereof.

9. The optical scanning device according to claim 8, wherein the delay signal output by said delay signal generating unit is terminated within a rage from one period before to one period after with respect to a point of time where the output of the resonance amplifier has a maximum value.

10. An optical scanning device, comprising:

a light source;

a scanning system which deflect the beam emitted by said light source to scan;

a light receiving unit having a plurality of light receiving elements arranged in a direction in which the scanning beams scans, a light receiving signal being output by each of said light receiving element upon incident of the scanning beam;

a resonance amplifying system that amplifies the light receiving signals of the light receiving elements;

a clock signal generating unit that generates a clock signal in accordance with the resonance amplified signals;

a delay signal generating unit that generates a delay signal for generating a synchronizing signal in accordance with the light receiving signals output by said plurality of light receiving elements; and a logic circuit which generates the synchronizing signal based on the clock signal output by said clock signal generating unit and said delay signal output by said delay signal generating unit.

11. The optical scanning device according to claim 10, wherein one of the plurality of light receiving elements which is firstly scanned by the scanning beam is constructed to have wider than the other light receiving elements.

12. The optical scanning device according to claim 10, wherein among all the light receiving elements, one of every predetermined number of light receiving elements is used for outputting the light receiving signal.

13. The optical scanning device according to claim 10, further comprising an adder that synthesizes the light receiving signals output by the light receiving elements, and wherein said resonance amplifying system includes:

a narrow-band amplifier that resonance amplify signals output by said adder; and a first comparator for comparing the resonance amplified signals output by said of narrow-band amplifier with a predetermined reference level, output signal of said first comparator being utilized as the clock signal.

14. The optical scanning device according to claim 10, wherein resonance frequency of said narrow-band amplifier substantially coincides with the frequency of the synthesized signal of the light receiving signals output from said adder.

15. The optical scanning device according to claim 11, wherein said delay signal generating unit comprises:

a second comparator that compares the sum of the light receiving signals output from said plurality of light receiving elements with a predetermined reference level; and a first timer circuit that is triggered in response to an output signal of said second comparator to output a delay signal for a predetermined period.

16. The optical scanning device according to claim 15, wherein the delay signal output by said delay signal generating unit is kept output at least when said light receiving signals are output by said plurality of light receiving elements.

17. The optical scanning device according to claim 16, wherein said delay signal is terminated by a point of time at which an amplitude of the output signal of said narrow-band amplifier is a half of the maximum value thereof.

18. The optical scanning device according to claim 17, wherein the delay signal output by said delay signal generating unit is terminated within a rage from one period before to one period after with respect to a point of time where the output of the resonance amplifier has a maximum value.

19. The optical scanning device according to claim 11, wherein said logic circuit unit comprises:

an enabling signal output system that outputs an enabling signal upon end of the delay signal output by said delay signal generating unit;

a second timer that outputs, in accordance with the first gate signal and the clock signal output by said clock signal generating unit, a gate signal which is kept for a predetermined period; and a logic gate that outputs the synchronizing signal when said delay signal and said gate signal are input.

20. An optical scanning device, comprising:

a light source;.

a scanning system which deflect the beam emitted by said light source to scan;

a light receiving unit having a plurality of light receiving elements arranged in a direction in which the scanning beams scans, a light receiving signal being output by each of said light receiving elements upon incident of the scanning beam;

a signal adding system that adds the light receiving signals output by said plurality of light receiving elements to generate an added signal;

a clock signal generating system that generates a clock signal based on said added signal, said clock signal corresponding to a scanning speed of the scanning beam;

a delay signal generating unit that generates a delay signal defining a delay period during which said clock signal is ignored, said delay signal being generated based on light receiving signals output by a part of said plurality of light receiving elements which are located on upstream side of a scanning direction of said scanning beam; and an SOS signal generating circuit which generates a synchronizing signal based on the clock signal and the delay signal.

21. The optical scanning device according to claim 20, wherein said clock signal generating system includes:

a resonance amplifier that resonance-amplifies the added signal; and a comparator that compares an amplitude of output of said resonance amplifier with a predetermined reference value, and outputs a comparison result, wherein said SOS signal generating circuit is allowed to output the SOS signal after the delay signal has been received, and wherein said delay signal generates the delay signal such that output of the SOS signal by the SOS signal generating circuit is inhibited until the output of said resonance amplifier would be stabilized.

22. The optical scanning device according to claim 21, wherein said SOS signal generating circuit generates said synchronizing signal in response to a rising edge of said clock signal which immediately comes after a falling edge of said clock signal which comes after the end of said delay signal.

* * * * *